US012615482B2

(12) United States Patent
Kreuzer et al.

(10) Patent No.: US 12,615,482 B2
(45) Date of Patent: Apr. 28, 2026

(54) EAR-WORN HEARING DEVICE WITH PHYSIOLOGICAL OR ACTIVITY SENSOR

(71) Applicant: KNOWLES ELECTRONICS, LLC, Itasca, IL (US)

(72) Inventors: Johannes Kreuzer, Munich (DE); David Biegger, Munich (DE); Leo Lorenz, Taufkirchen (DE); Christopher Monti, Elgin, IL (US); Charles King, Oak Park, IL (US)

(73) Assignee: KNOWLES ELECTRONICS, LLC, Itasca, IL (US)

( * ) Notice: Subject to any disclaimer, the term of this patent is extended or adjusted under 35 U.S.C. 154(b) by 299 days.

(21) Appl. No.: 18/361,691

(22) Filed: Jul. 28, 2023

(65) Prior Publication Data

US 2024/0414487 A1 Dec. 12, 2024

Related U.S. Application Data

(60) Provisional application No. 63/507,676, filed on Jun. 12, 2023.

(51) Int. Cl.
*H04R 25/00* (2006.01)

(52) U.S. Cl.
CPC .......... *H04R 25/60* (2013.01); *H04R 25/652* (2013.01); *H04R 2225/025* (2013.01)

(58) Field of Classification Search
CPC ...... H04R 1/1075; H04R 25/60; H04R 25/65; H04R 25/609; H04R 25/652; H04R 2225/025; H04R 2225/67; H04R 2225/57; H04R 2460/15
See application file for complete search history.

(56) References Cited

U.S. PATENT DOCUMENTS

| | | | | |
|---|---|---|---|---|
| 11,463,828 | B2 * | 10/2022 | Badillo | H04R 25/505 |
| 2017/0214994 | A1 | 7/2017 | Gadonniex et al. | |
| 2020/0213787 | A1 * | 7/2020 | Houcek | H04R 1/1075 |
| 2020/0319752 | A1 | 10/2020 | King et al. | |
| 2024/0148326 | A1 * | 5/2024 | Monti | H04R 25/603 |

OTHER PUBLICATIONS

Monti et al., U.S. Appl. No. 17/981,800, entitled, "Ear-Worn Hearing Device With Physiological Sensor", 22 pages, filed Nov. 7, 2022.

* cited by examiner

*Primary Examiner* — Sunita Joshi

(57) ABSTRACT

An ear-worn hearing device is disclosed and includes a body portion with a sound-producing transducer acoustically coupled to a sound passage of a nozzle. a resilient portion protrudes from a side of the body portion and includes a physiological or activity sensor coupled to a flexible portion of a flex harness. The resilient portion at least partially covers a portion of the flex harness without impeding operation of the sensor, wherein the flexible portion and the sensor are flexible toward and away from the body portion upon depression and release of the resilient portion.

19 Claims, 6 Drawing Sheets

EAR-WORN HEARING DEVICE WITH PHYSIOLOGICAL OR ACTIVITY SENSOR

RELATED APPLICATION

This application claims priority to U.S. Provisional Patent Application Ser. No. 63/507,676, filed Jun. 12, 2023, and entitled "EAR-WORN HEARING DEVICE WITH PHYSIOLOGICAL OR ACTIVITY SENSOR", owned by instant assignee, the entire contents of which are hereby incorporated by reference.

FIELD OF THE DISCLOSURE

The present disclosure relates generally to ear-worn hearing devices and more particularly to ear-worn hearing devices comprising one or more physiological or activity sensors integrated with a resilient portion of the hearing device.

BACKGROUND

Consumers have shown increasing interest in ear-worn hearing devices comprising a sensor that monitors heart rate, blood pressure, and other physiological conditions. The sensor must generally be relatively fixed near or in direct contact with ear tissue for accurate sensing. But most in-ear hearing devices tend to move within the ear during physical activity and otherwise may not optimally position the sensor for accurate sensing. To address this issue, some ear-worn hearing devices integrate the sensor with a pliable ear-tip that directly contacts ear-canal tissue. But integrating the sensor and related electronic parts with an ear-tip is complicated and costly. Additionally, ear-tips come in a variety of sizes and amplification settings to accommodate different user anatomies and varying degrees of hearing loss. Also, ear-tips are often replaced when damaged or lost. Maintaining a large inventory of, or replacing, ear-tips comprising integrated sensors further increases costs. Thus there is an ongoing need to improve ear-worn hearing devices comprising one or more sensors.

BRIEF DESCRIPTION OF THE DRAWINGS

The objects, features and advantages of the present disclosure will become more fully apparent to those of ordinary skill in the art upon consideration of the following detailed description and appended claims in conjunction with the accompanying drawings. The drawings depict only representative embodiments and are not considered to limit the scope of the disclosure.

Those of ordinary skill in the art will appreciate that the figures are illustrated for simplicity and clarity and therefore may not be drawn to scale and may not include well-known features, that the order of occurrence of actions or steps may be different than the order described, that the order of occurrence of such actions or steps may be performed concurrently unless specified otherwise, and that the terms and expressions used herein have meanings understood by those of ordinary skill in the art, except where a different meaning is specifically attributed to them herein.

DETAILED DESCRIPTION

The present disclosure relates generally to ear-worn hearing devices and more particularly to ear-worn hearing devices comprising one or more physiological or activity sensors. The hearing devices also comprises a body portion comprising a sound-producing transducer acoustically coupled to a sound passage of a nozzle. A resilient portion protruding from a side of the body portion comprises a flex harness and the one or more sensors. The flex harness and the one or more sensors are flexible toward and away from the body portion upon depression and release of the resilient portion. The resilient portion is configured to bias the one or more sensors toward the user's ear tissue when the hearing device is worn by the user for optimal sensor performance. The disclosure is applicable to hearing devices configured for at least partial insertion into a user's ear-canal and to hearing devices configured for wearing in or on the user's concha, with or without an electrical cable assembly. Representative examples are described further herein.

Figure 1:
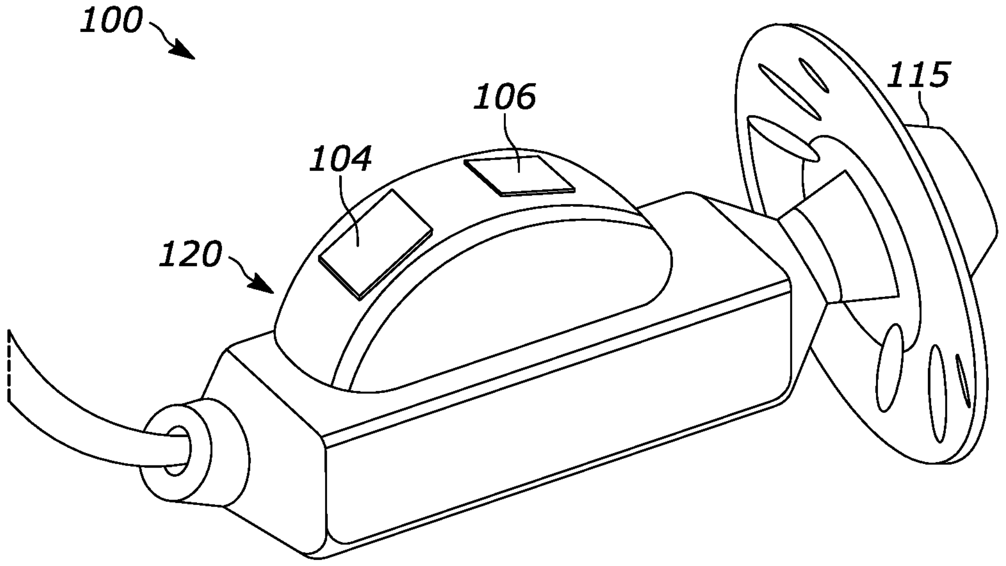
FIG. 1 is a perspective view of a representative ear-worn hearing device.
Figure 2:
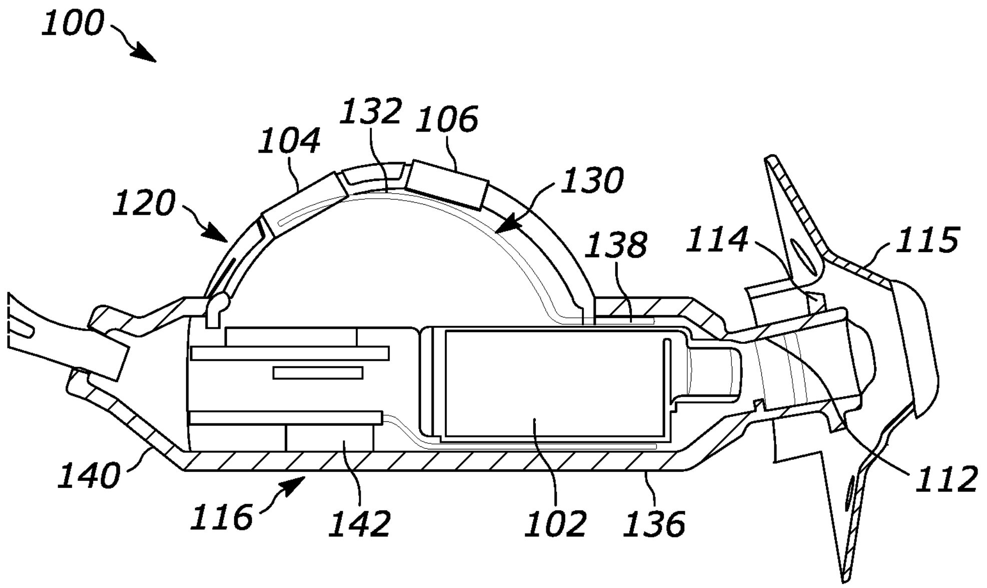
FIG. 2 is a sectional view of a representative ear-worn hearing device.
Figure 3:
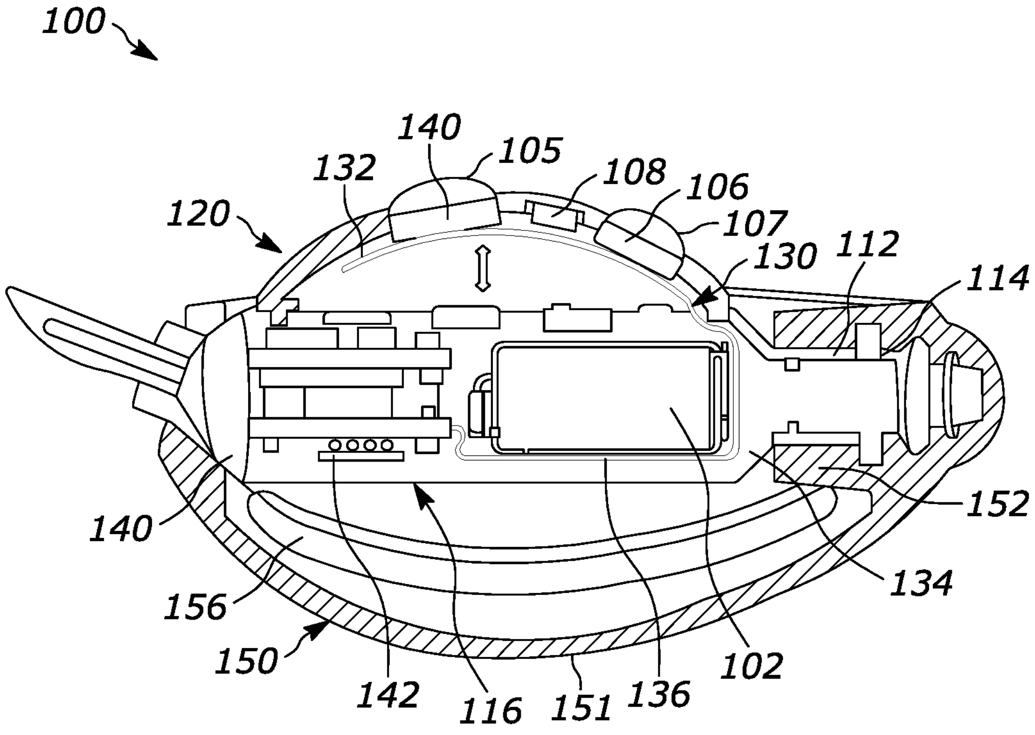
FIG. 3 is a sectional view of another representative ear-worn hearing device.

FIGS. 1-3 illustrate representative ear-worn hearing devices 100 configured for at least partial insertion into a user's ear-canal. In the sectional views of FIGS. 2-3, the hearing devices comprise a body portion comprising the sound-producing transducer 102 acoustically coupled to a sound passage 112 of a nozzle 114. In FIGS. 1 and 2, the transducer is fully contained within a housing 116 comprising a nozzle 114 and a resilient ear-tip 115 is coupled to the nozzle, wherein the ear-tip is configured for at least partial insertion into the ear canal. Alternatively, the transducer can be partially contained in an open-ended housing and the nozzle can be a spout integrated with the transducer. In this alternative, the housing can be configured as a socket into which a portion of the transducer, opposite the nozzle, is disposed and retained. Thus the body portion can comprise a housing within which the transducer is fully or partially contained. The sound-producing transducer can be implemented as one or more balanced armature receivers or dynamic speakers or a combination thereof.

Physiological sensors can monitor cardiac cycles, heart rate, blood pressure, blood oxygen, and temperature, among other physiological conditions. Representative physiological sensors include but are not limited to photoplethysmogram (PPG) sensors and temperature sensors. PPG sensors generally comprise an emitter configured as at least one single-color or multi-color light emitting diode (LED) and a receiver configured as one or more photodiodes. Other sensors include activity sensors and electrodes for detecting various conditions. Representative activity sensors include vibration sensors and accelerometers, among others. The performance of these and other sensors can be optimized or at least improved when the one or more sensors contact or are in close proximity to ear tissue as described herein.

Figure 4:
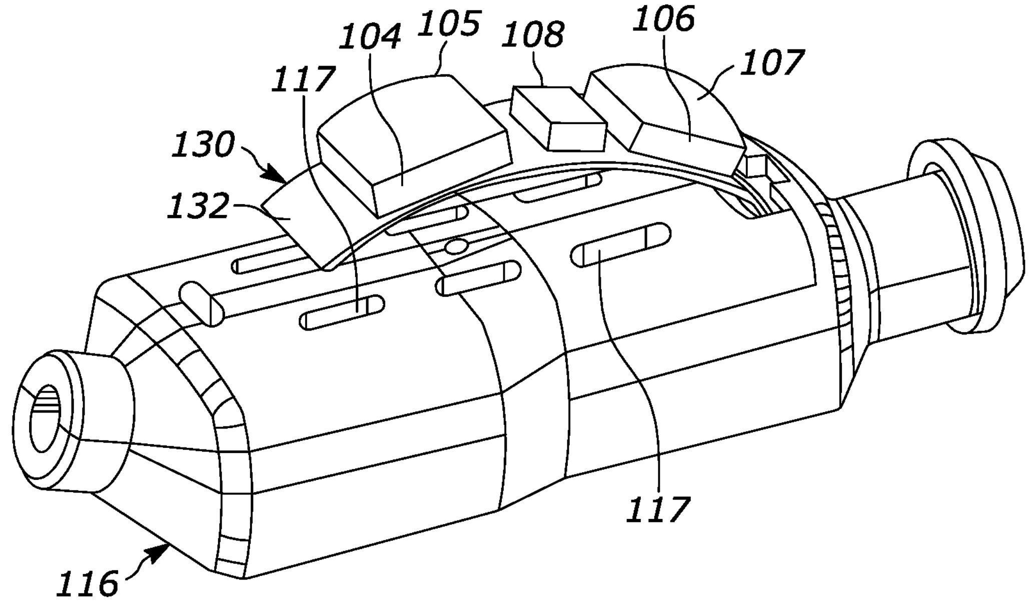
FIG. 4 is a perspective view of a representative ear-worn hearing device without a resilient portion.
Figure 11:
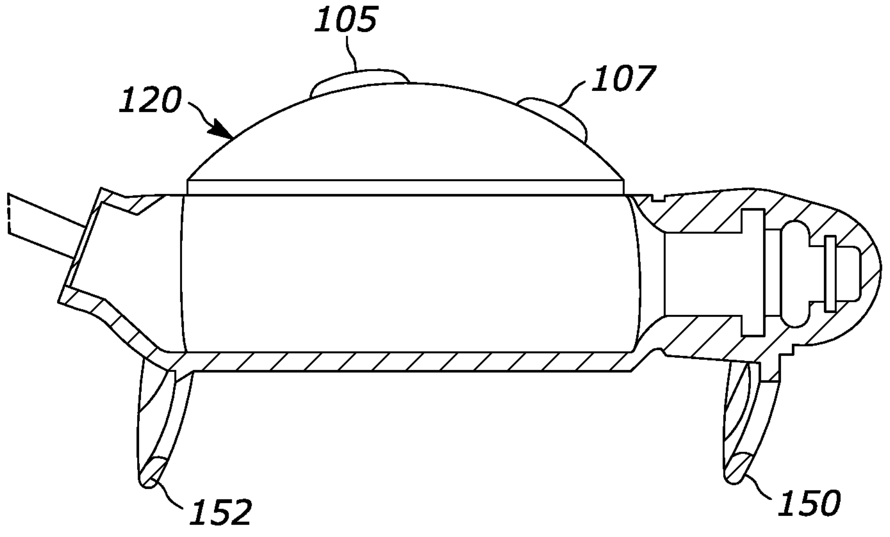
FIG. 11 is a partial sectional view of another representative ear-worn hearing device.

In FIGS. 1-4 and 6-11, the representative hearing devices comprises a PPG sensor including an emitter 104 and a receiver 106. In FIGS. 3, 4 and 8-10, the hearing device also comprises another sensor 108 implemented as a temperature, vibration or other sensor. Some hearing devices may include additional sensors. In FIGS. 3, 4, and 11, the emitter 104 and receiver 106 integrated with the flex harness are covered by a cover or lens 105 and 107. Other sensors can also be covered by a cover or lens. The cover or lens can protect the sensor or underlying component from contamination and can be readily cleaned. In some implementations, the cover or lens functions as a light guide or pipes that transmits and directs light. The cover or lens can be configured to focus or diffuse light onto the ear tissue. A cover or lens with a glossy surface can promote wetting to the user's skin to improve light transmission into or out of the ear tissue. Thus configured, each sensor can detect or transmit signals through a corresponding aperture or window.

In FIGS. 2-3, a resilient portion 120 protruding from a side of the body portion comprises a flex harness 130 and one or more sensors coupled to a flexible portion 132 of the flex harness. The resilient portion at least partially covers a portion of the flex harness without obstructing the one or more sensor or otherwise impeding the operation thereof. The resilient portion can comprise an aperture or window aligned with each sensor to permit unobstructed operation of the sensors, wherein each sensor can detect or transmit signals through a corresponding aperture or window. In implementations where the sensor comprises a light emitter and receiver, the resilient portion can be relatively opaque to isolate the receiver from contamination by light from the emitter before such light impinges on the user's ear tissue. The flexible portion of the flex harness and the one or more sensors are flexible toward and away from the body portion upon depression and release of the resilient portion. Thus configured the resilient portion biases the one or more sensors toward the user's ear tissue for optimal sensor performance.

Figure 5:
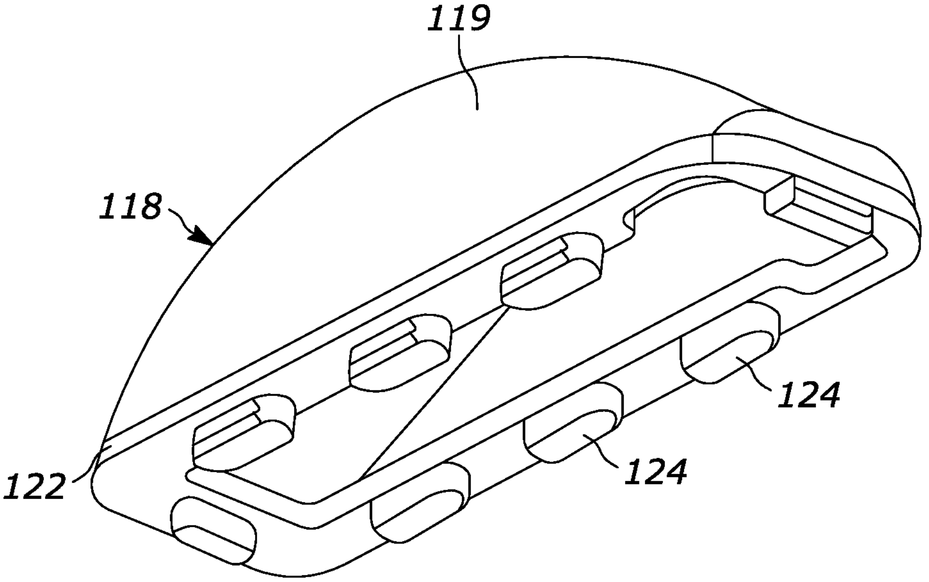
FIG. 5 is a perspective view of a resilient portion of an ear-worn hearing device.

In the representative implementation of FIG. 5, a resilient portion 118 is integrated with a base 122 comprising locating feet 124 that can be assembled in corresponding apertures 117 of the housing 116 shown in FIG. 4. In FIG. 5, the resilient portion comprises a convex portion, but the resilient portion can comprise other shapes in alternative embodiments. The base provides structure for the resilient portion. The base can be fastened to the housing by snap-fitting tabs on some or all of the locating feet or by glue or by a combination of snap-fitting taps and glue. The resilient portion can be more pliable than the base and locating feet, to provide a comfortable fit for the user. For this purpose, the resilient convex portion can be made of a silicone rubber or other polymer and the base can be harder plastic or polymer, metal or some other material.

The flexible portion of the flex harness is generally configured to extend from the body portion and into the resilient portion. FIGS. 2-3 show the flexible portion 132 of the flex harness extending from the housing 116 and into the resilient portion 120. The flexible portion can be a linear or curved cantilevered portion protruding from the body portion, and the flexible portion can have a shape similar to the shape of the resilient portion. In FIGS. 2-4 and FIGS. 6-10, the flexible portion 132 has an arcuate shape configured for integration with the resilient convex portion. The flex harness provides an electrical and mechanical interconnect between the one or more sensors and an electrical interface of the hearing device. The sensors are electrically and mechanically connected to the flexible portion of the flex circuit. Such connections can be solder-connections or conductive paste connections, among other known and future electrical and mechanical connections.

In one implementation, the resilient portion comprises a hollow convex portion and the flexible portion of the flex harness is disposed within the hollow convex portion. A vent can be provided in the hollow convex portion to increase compliance of the resilient portion. The vent can extend into the housing or into the atmosphere. In another implementation, the resilient portion comprises a solid convex portion and the flexible portion of the flex harness is at least partially embedded within the solid convex portion. In both implementations, the sensor and the flexible portion of the flex harness are flexible upon depression and release of the resilient portion.

Figure 6:
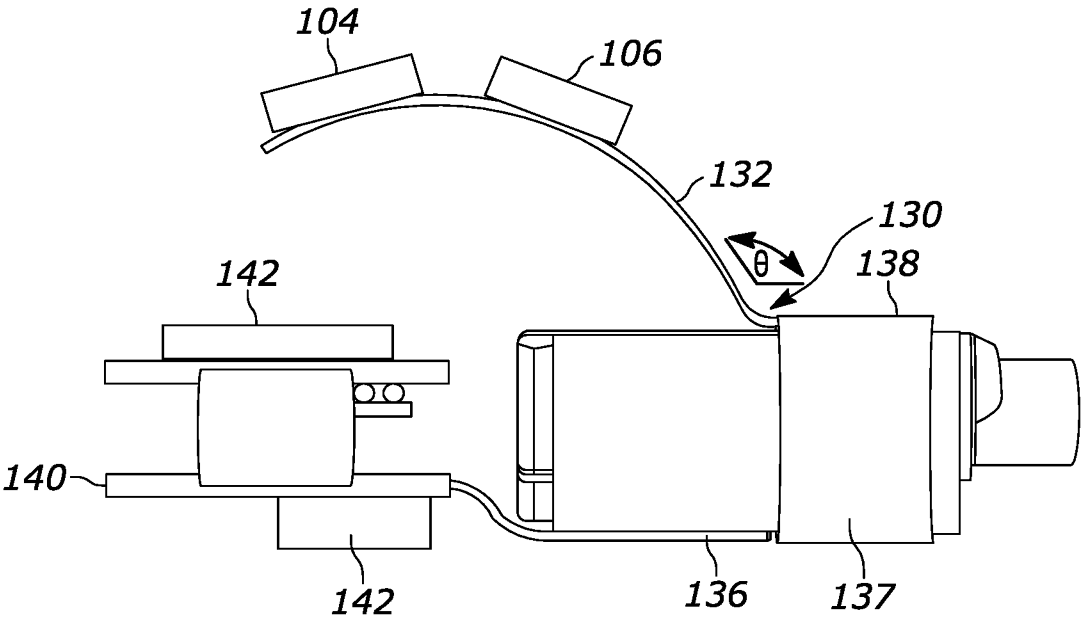
FIG. 6 is side view of a partial assembly of a representative ear-worn hearing device.
Figure 7:
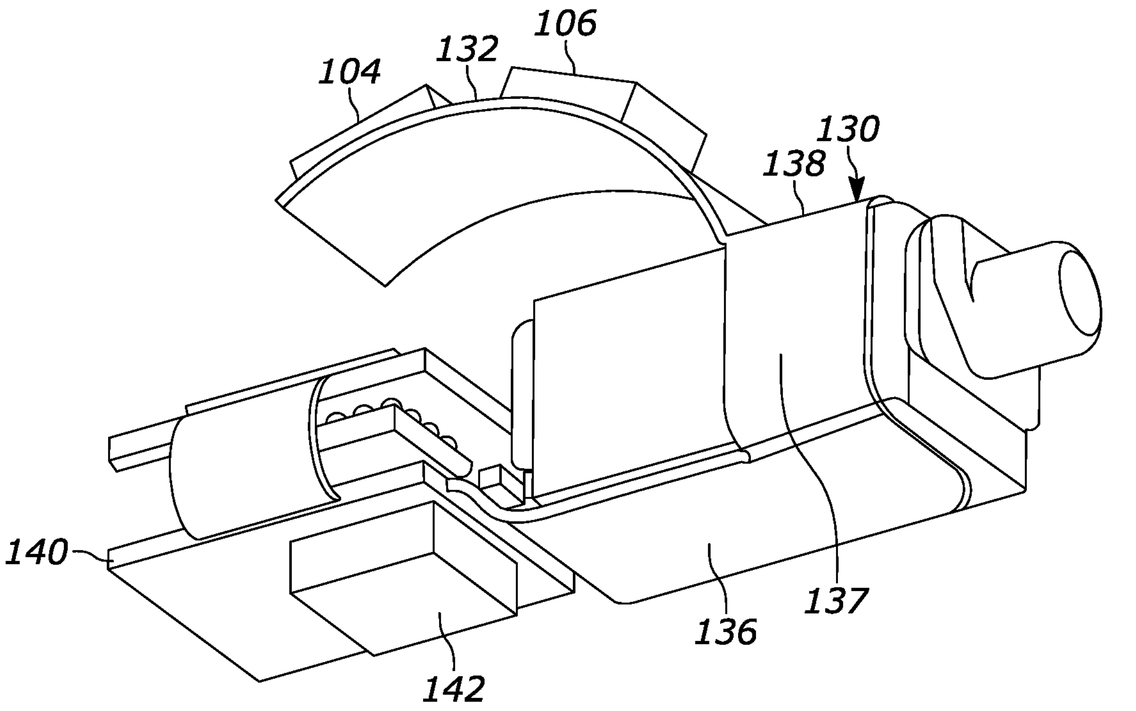
FIG. 7 is a perspective view of FIG. 6.

The flex harness is mechanically fastened to the body portion and electrically connected to an electrical interface as described further herein. Appropriate configuration of the flex harness within the housing can reduce the likelihood of breaking electrical conductors of the flex harness due to excessive bending. In one implementation, the flex harness has no bend-angle less than 85 degrees between adjacent sections of the flex harness as shown by angle $\phi$ in FIG. 6. In FIG. 6, portions 132 and 138 of the flex harness are adjacent. In FIG. 7, similarly, portions 137 and 138 of the flex harness are considered adjacent, as are portions 136 and 137. In some implementations, the flex circuit is partially folded about, and adjacent two or more surfaces of, the sound-producing transducer. The flex harness can be adhered to one or more surface of the transducer or to the housing or to other structure of the body portion, or combinations thereof. Representative examples are described further herein.

Figure 8:
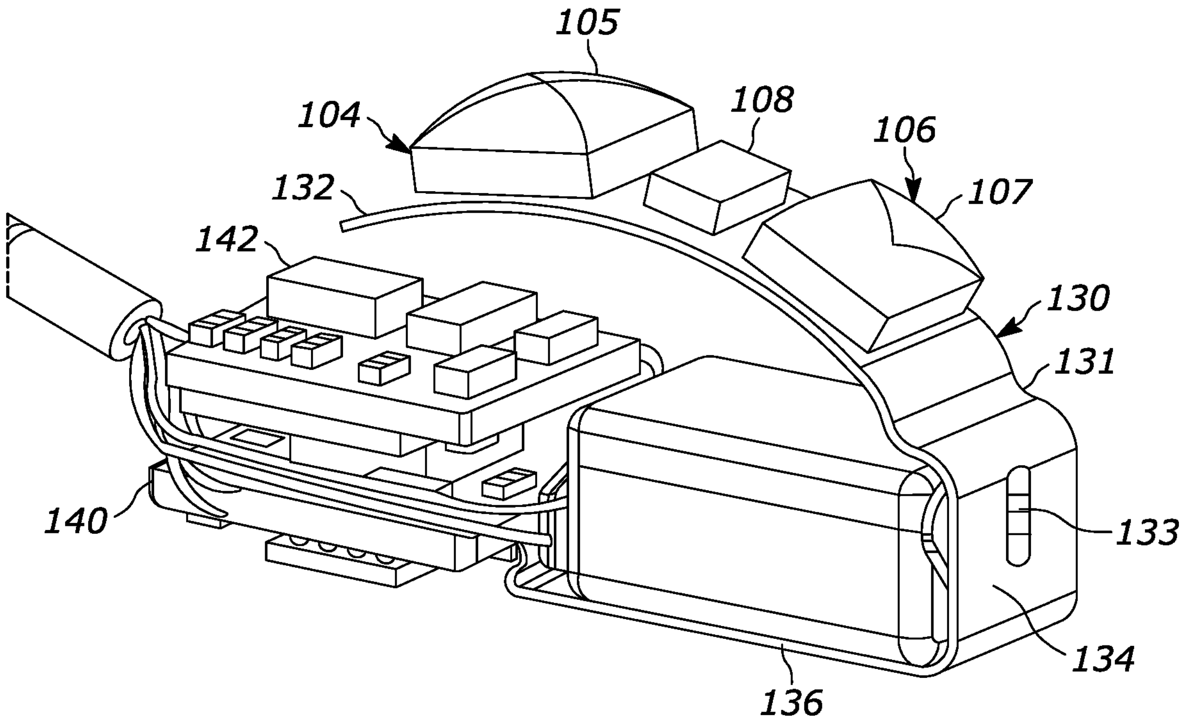
FIG. 8 is a perspective view of a partial assembly of another representative ear-worn hearing device.
Figure 9:
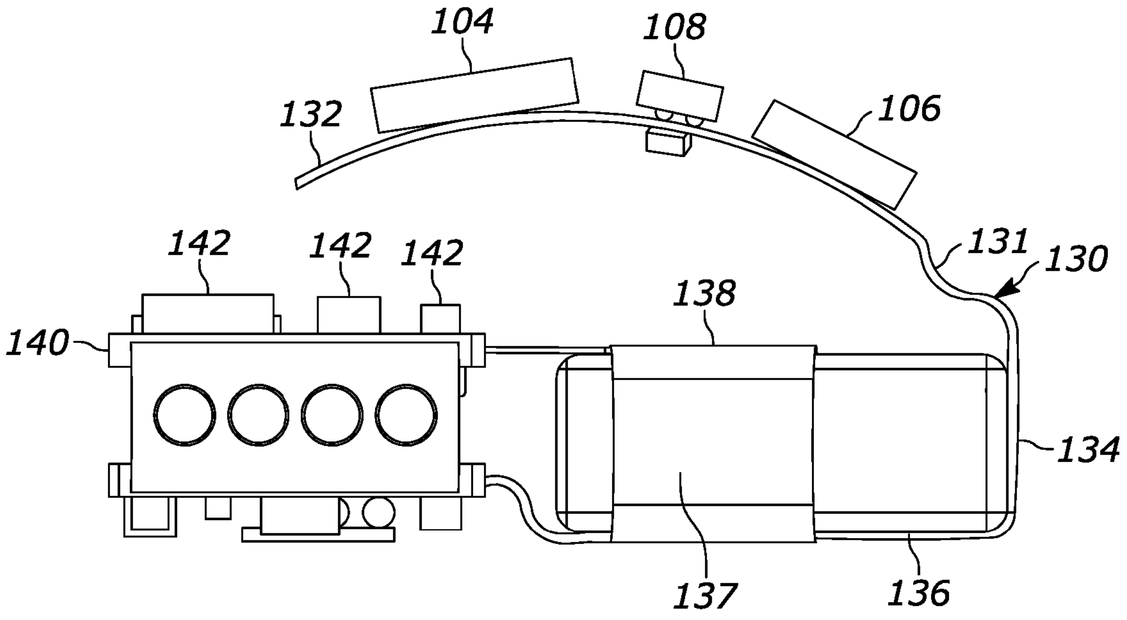
FIG. 9 is a side view of a partial assembly of another representative ear-worn hearing device.
Figure 10:
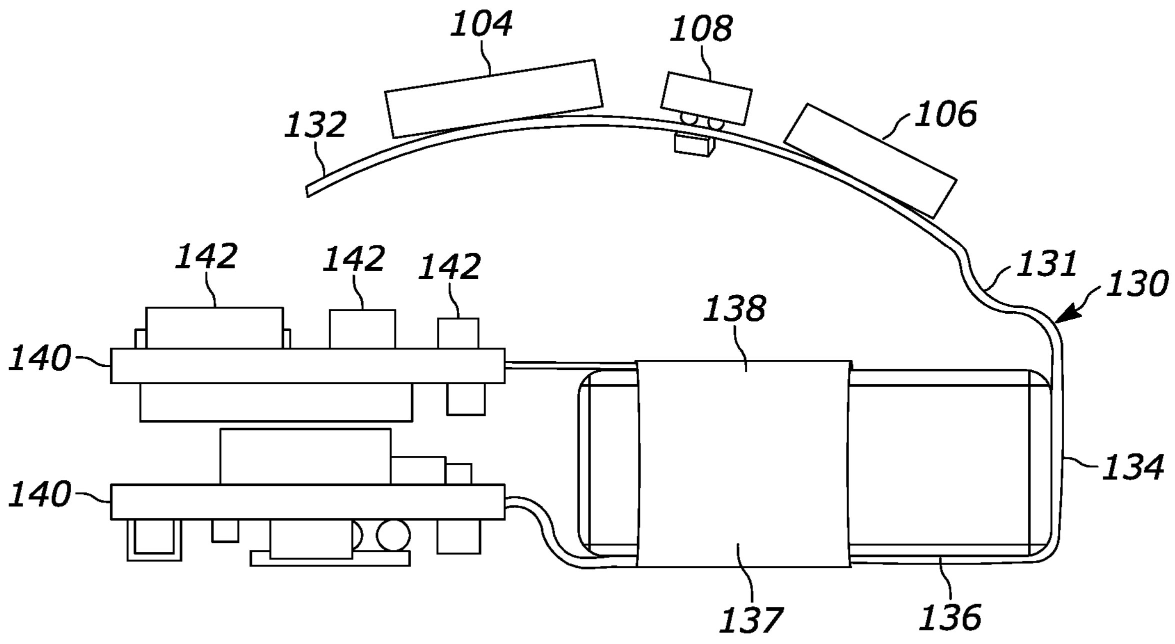
FIG. 10 is a side view of a partial assembly of yet another representative ear-worn hearing device.

In FIG. 3 and FIGS. 8-10, a portion of the flex harness 130 within the housing is folded or wrapped about at least two different surfaces of the sound-producing transducer, wherein one of surface of the transducer comprises a sound port. Thus configured, flex harness portion 134 is adjacent the end surface comprising the sound port and flex harness portion 136 is adjacent a bottom surface of the transducer. The flex harness portion 134 comprises an opening 133 aligned with a sound port to permit the passage of sound, as best shown in FIG. 8. This configuration positions the cantilever hinge 131 of the flex harness as near the sound port as possible without requiring excessive bending of the flex harness. Thus configured, the resilient portion can be positioned toward an end of the hearing device that extends deepest into the ear canal.

In FIGS. 6, 7, 9 and 10, a portion of the flex harness 130 within the housing is folded or wrapped about at least three different surfaces of the sound-producing transducer. Thus configured flex harness portion 136 is adjacent a bottom surface of the transducer, flex harness portion 137 is adjacent a side surface, and flex harness portion 138 is adjacent a top surface of the transducer. In FIGS. 6-7, the flex harness does not cover the end surface of the housing comprising the sound port. Other flex harness configurations are also possible.

The electrical interface can be a circuit board or an electrical connection with one or more electrical components. In FIGS. 2-3 and FIGS. 6-10, the electrical interface is a circuit board 140 to which the flex harness is electrically connected. In some hearing devices (e.g., in-the-ear (ITE) or in-the-canal (ITC) units), the electrical interface is connected to circuit components (e.g., a processor, transducer drivers, etc.) all of which are contained within the body portion of housing, as shown best in FIGS. 2-3. In other hearing devices, some circuit components are contained in a base unit (e.g., BTE unit) connected to the interface circuit of the hearing device (e.g., receiver-in-canal (RIC) unit) by a cable assembly.

In some implementations, the hearing device comprises one or more resilient lobes protruding from a side of the hearing device opposite the resilient lobe with the one or more sensors. The one or more resilient lobes can be assembled either proximate the nozzle or proximate a portion of the housing opposite the nozzle, or at both locations. The one or more resilient lobes can be permanently or replaceably assembled with the hearing device housing. The one or more resilient lobes are flexible relative to the housing and can bias the resilient portion comprising the one or more sensors toward ear tissue to improve the performance of the one or more sensors upon insertion of the hearing device into the user's ear-canal.

In FIG. 3, a resilient lobe 150 comprises a quasi-spheroidal surface 151 removably assembled partially about the hearing device housing to bias the resilient portion 120 and one or more sensors toward the user's ear tissue. The quasi-spheroidal surface is located predominately on a side of the hearing device opposite the side on which the one or more sensors are located. The quasi-spheroidal surface comprises an opening on the side of the hearing device at which the resilient portion is located. The quasi-spheroidal surface comprises a base portion 152 with a passage into which the nozzle 112 extends, and another end portion 154 assembled at a portion of the hearing device opposite the nozzle. The representative quasi-spheroidal surface optionally comprises a plurality of longitudinal openings 156 that extend along a longitudinal dimension of the hearing device when assembled therewith. The openings 156 increase flexibility of the resilient lobes for improved comfort when the hearing device is worn by the user's ear. In other implementations, the openings 156 can have other shapes.

In FIG. 11 a first resilient lobe 170 is assembled proximate the nozzle of the hearing device and a second resilient lobe 172 is assembled proximate a portion of the hearing device opposite the nozzle. The one or more resilient lobes protrude from a side of the hearing device generally opposite the side at which the resilient portion 120 is located. Thus configured, the one or more resilient lobes have greater stiffness on the side of the hearing device opposite the resilient portion 120 and bias the one or more sensors portion toward the user's ear tissue when the hearing device is worn in or on the ear.

In FIGS. 1, 3, 8 and 11, the hearing devices comprise an electrical cable assembly 103 coupled to a portion of the hearing device opposite the nozzle. The cable assembly can connect a receiver-in-canal (RIC) or other ear-worn unit to a behind-the-ear (BTE) or other base unit. Such cable assemblies are typically shape-retaining and configured to extend between the base unit and the ear-worn unit. In some implementations, the electrical cable assembly biases the resilient portion toward the user's ear tissue when the hearing device is worn on or at least partially in the ear. The one or more sensors can be biased toward the ear tissue by the cable assembly 103 alone or in combination with resilient lobe 150 described in connection with FIG. 3 or in combination with the first or second resilient lobes 120 and 130 described in connection with FIG. 11. Other hearing devices are fully contained in or on the user's ear and do not required an electrical cable assembly.

While the disclosure and what is presently considered to be the best mode thereof has been described in a manner establishing possession and enabling those of ordinary skill in the art to make and use the same, it will be understood and appreciated that there are many equivalents to the representative embodiments described herein and that myriad modifications and variations may be made thereto without departing from the scope and spirit of the invention, which is to be limited not by the embodiments described but by the appended claims and their equivalents.

What is Claimed is:

What is claimed is:

1. An ear-worn hearing device comprising:

a body portion comprising a sound-producing transducer acoustically coupled to a sound passage of a nozzle; and a resilient portion protruding from a side of the body portion and comprising a physiological or activity sensor coupled to a flexible portion of a flex harness, the resilient portion at least partially covering a portion of the flex harness without impeding operation of the sensor, wherein the flexible portion and the sensor are flexible toward and away from the body portion upon depression and release of the resilient portion.

2. The hearing device of claim 1, the flexible portion configured to extend from the body portion and into the resilient portion, wherein the flex harness has no bend-angle less than 85 degrees.

3. The hearing device of claim 1, the resilient portion comprising an aperture or window aligned with the sensor, wherein the sensor can detect or transmit signals through the aperture or window.

4. The hearing device of claim 3, the resilient portion comprising a hollow convex portion, the flexible portion of the flex harness disposed within the hollow convex portion, wherein deformation of the hollow convex portion flexes the sensor and the flexible portion of the flex harness.

5. The hearing device of claim 4, the hollow convex portion comprising a vent, wherein the vent increases compliance of the resilient portion.

6. The hearing device of claim 3, the resilient portion comprising a solid convex portion, the flexible portion of the flex harness embedded within the solid convex portion, wherein deformation of the solid convex portion flexes the sensor and the flexible portion of the flex harness.

7. The hearing device of claim 1, the body portion further comprising an electrical interface, the flex harness electrically connected to the electrical interface and mechanically fastened to the body portion.

8. The hearing device of claim 7, the body portion further comprising a housing within which the sound-producing transducer is contained, a portion of the flex harness within the housing configured with portions adjacent at least two different surfaces of the sound-producing transducer.

9. The hearing device of claim 8, the sound-producing transducer comprising a sound port on a surface of the transducer, a portion of the flex harness disposed on the surface of the transducer and comprising an opening aligned with the sound port, wherein the sound port is acoustically coupled to the sound passage.

10. The hearing device of claim 8, wherein the flex harness has no bend-angles less than 85 degrees between adjacent portions of the flex harness.

11. The hearing device of claim 1 further comprising a resilient lobe replaceably assembled to the body portion, wherein the resilient lobe biases the resilient portion toward ear canal tissue when the hearing device is at least partially inserted into a users' ear canal.

12. The hearing device of claim 1 further comprising a cable assembly coupled to the body portion and comprising a conductor electrically connected to the sound-producing transducer.

13. The hearing device of claim 12, the cable assembly further comprising a shape-retaining conductor conduit, wherein the cable assembly biases the resilient portion toward ear canal tissue when the hearing device is at least partially inserted into a user's ear canal.

14. The hearing device of claim 1, further comprising an ear-tip coupled to the nozzle, wherein the ear-tip is configured for at least partial insertion into a user's ear canal.

15. An ear-worn hearing device comprising:

a body portion comprising a sound-producing transducer acoustically coupled to a sound passage of a nozzle;

a flex harness comprising a flexible portion protruding from the body portion, portions of the flex harness configured adjacent at least two different surfaces of the sound-producing transducer;

a physiological or activity sensor coupled to the flexible portion of a flex harness; and a resilient portion protruding from a side of the body portion, the resilient portion at least partially covering the flexible portion of the flex harness without obstructing the sensor, wherein the flexible portion and the sensor are flexible toward and away from the body portion upon depression and release of the resilient portion.

16. The hearing device of claim 15, wherein the flex harness has no bend-angles less than 85 degrees between adjacent portions of the flex harness.

17. The hearing device of claim 15, the sound-producing transducer comprising a sound port on a surface of the transducer, a portion of the flex harness disposed on the surface of the transducer and comprising an opening aligned with the sound port, wherein the sound port is acoustically coupled to the sound passage.

18. The hearing device of claim 15, portions of the flex harness configured adjacent at least three different surfaces of the sound-producing transducer, wherein the flex harness is fastened to the sound-producing transducer.

19. The hearing device of claim 15, the body portion further comprising a housing in which the sound-producing transducer is at least partially contained, a portion of flex harness located between the housing and the sound-producing transducer.

* * * * *